US010110956B2

(12) United States Patent
Reznik et al.

(10) Patent No.: US 10,110,956 B2
(45) Date of Patent: Oct. 23, 2018

(54) VIEWING CONDITIONS ESTIMATION FOR ADAPTIVE DELIVERY OF VISUAL INFORMATION IN A VIEWING ENVIRONMENT

(71) Applicant: VID SCALE, INC., Wilmington, DE (US)

(72) Inventors: Yuriy Reznik, Seattle, WA (US); Eduardo Asbun, San Diego, CA (US); Robert L. Olesen, Huntington, NY (US); Gregory S. Sternberg, Mt. Laurel, NJ (US); Louis Kerofsky, San Diego, CA (US); Ralph Neff, San Diego, CA (US); Rahul Vanam, San Diego, CA (US)

(73) Assignee: VID SCALE, INC, Wilmington, DE (US)

( * ) Notice: Subject to any disclaimer, the term of this patent is extended or adjusted under 35 U.S.C. 154(b) by 0 days.

(21) Appl. No.: 14/915,750

(22) PCT Filed: Sep. 4, 2014

(86) PCT No.: PCT/US2014/054013
§ 371 (c)(1),
(2) Date: Mar. 1, 2016

(87) PCT Pub. No.: WO2015/034997
PCT Pub. Date: Mar. 12, 2015

(65) Prior Publication Data
US 2016/0198225 A1 Jul. 7, 2016

Related U.S. Application Data

(60) Provisional application No. 61/873,756, filed on Sep. 4, 2013, provisional application No. 62/026,688, filed on Jul. 20, 2014.

(51) Int. Cl.
H04N 5/445 (2011.01)
H04N 21/462 (2011.01)
(Continued)

(52) U.S. Cl.
CPC ....... *H04N 21/4621* (2013.01); *H04N 5/4403* (2013.01); *H04N 21/238* (2013.01);
(Continued)

(58) Field of Classification Search
CPC ................................. H04N 21/2662
(Continued)

(56) References Cited

U.S. PATENT DOCUMENTS 5,488,434 A 1/1996 Jung
6,766,035 B1 * 7/2004 Gutta .................. G06K 9/0057
348/E7.079
(Continued)

FOREIGN PATENT DOCUMENTS

CN 101155289 A 4/2008
CN 101742282 A 6/2010
(Continued)

OTHER PUBLICATIONS

3rd Generation Partnership Project (3GPP), TS 26.247 V10.0.0, "Technical Specification Group Services and System Aspects, Transparent end-to-end Packet-Switched Streaming Service (PSS), Progressive Download and Dynamic Adaptive Streaming over HTTP (3GP-DASH) (Release 10)", Jun. 2011, pp. 1-94.
(Continued)

*Primary Examiner* — Michael Hong
(74) *Attorney, Agent, or Firm* — Condo Roccia Koptiw LLP

(57) ABSTRACT

Visual information may be delivered to streaming-capable devices in a viewing environment, such as a home environment or a commercial environment. The visual information
(Continued)

can be adapted to user behavior and/or viewing conditions in such a way as to deliver a satisfactory user experience while conserving network resources, such as bandwidth and/or capacity. Viewing distance and/or ambient light, which may affect viewing conditions in a viewing environment, may be estimated. Bandwidth may be reduced by eliminating details that may not be perceived by the user in the estimated viewing conditions (e.g., by determining a spatial resolution (e.g. a maximum spatial resolution) perceptible under the viewing conditions and not exceeding that spatial resolution).

13 Claims, 21 Drawing Sheets

(51) Int. Cl.

| | | |
|---|---|---|
| H04N 21/2343 | (2011.01) | |
| H04N 21/422 | (2011.01) | |
| H04N 21/442 | (2011.01) | |
| H04N 21/845 | (2011.01) | |
| H04N 21/238 | (2011.01) | |
| H04N 21/258 | (2011.01) | |
| H04N 21/4223 | (2011.01) | |
| H04N 21/2662 | (2011.01) | |
| H04N 5/44 | (2011.01) | |

(52) U.S. Cl.
CPC ... *H04N 21/2343* (2013.01); *H04N 21/23439* (2013.01); *H04N 21/234363* (2013.01); *H04N 21/25841* (2013.01); *H04N 21/4223* (2013.01); *H04N 21/42202* (2013.01); *H04N 21/44209* (2013.01); *H04N 21/44218* (2013.01); *H04N 21/8456* (2013.01); *H04N 21/2662* (2013.01); *H04N 2005/4444* (2013.01)

(58) Field of Classification Search
USPC .......................................................... 725/46
See application file for complete search history.

(56) References Cited

U.S. PATENT DOCUMENTS

| | | | |
|---|---|---|---|
| 2008/0074444 A1 | 3/2008 | Morikawa et al. | |
| 2010/0295873 A1* | 11/2010 | Dodge | G09G 5/00 345/690 |
| 2011/0164855 A1* | 7/2011 | Crockett | G10L 21/02 386/230 |
| 2011/0211114 A1* | 9/2011 | Cooper | H04N 21/44218 348/441 |
| 2013/0030873 A1 | 1/2013 | Davidson | |
| 2013/0125155 A1* | 5/2013 | Bhagavathy | H04N 21/2343 725/10 |
| 2014/0258201 A1* | 9/2014 | Finlow-Bates | G01S 19/42 706/46 |

FOREIGN PATENT DOCUMENTS

| | | |
|---|---|---|
| JP | 2008-236794 A | 10/2008 |
| WO | WO 2010/059262 A1 | 5/2010 |
| WO | WO 2012/015460 A1 | 2/2012 |

OTHER PUBLICATIONS

Android, "Sensor", Available at https://developer.android.com/reference/android/hardware/Sensor.html#TYPE_LIGHT, retrieved on Sep. 12, 2017, 33 pages.

Conklin et al., "Video Coding for Streaming Media Delivery on the Internet", IEEE Transactions on Circuits and Systems for Video Technology, vol. 11, No. 3, Mar. 2001, pp. 269-281.

Fujine et al., "The Relationship between Preferred Luminance and TV Screen Size", Proc. SPIE 6808, Image Quality and System Performance V, vol. 68080Z, Jan. 28, 2008, 12 pages.

ISO/IEC, "Information Technology—Dynamic Adaptive Streaming over HTTP (DASH)—Part 1: Media Presentation Description and Segment Formats", ISO/IEC 23009-1:2012, Apr. 2012, 2 pages.

Nathan et al., "Television Viewing at Home: Distances and Visual Angles of Children and Adults", Human Factors: The Journal of the Human Factors and Ergonomics Society, vol. 27, No. 4, 1985, 4 pages.

Proakis et al., "Digital Communications", McGraw-Hill, Higher Education, Fifth Edition, Jan. 1, 2008, 1170 pages.

Samsung, "Samsung Transforms the Home Entertainment Experience with Intelligent Navigation and Discovery", Available at http://www.samsung.com/us/news/newsRead.do?news_seq=20345, Jan. 7, 2013, 5 pages.

U.S. Department of Energy, "Analysis of Room Illuminance and Televisions with Automatic Brightness Control: Energy Efficiency Program for Consumer Products: Television Sets", Assistant Secretary, Office of Energy Efficiency and Renewable Energy Building Technologies Program, Appliances and Commercial Equipment Standards, Washington, DC 20585, Mar. 2012, 33 pages.

* cited by examiner

VIEWING CONDITIONS ESTIMATION FOR ADAPTIVE DELIVERY OF VISUAL INFORMATION IN A VIEWING ENVIRONMENT

CROSS REFERENCE TO RELATED APPLICATIONS

This application is the National Stage Entry under 35 U.S.C. § 371 of Patent Cooperation Treaty Application No. PCT/US2014/054013, filed Sep. 4, 2014, which claims the benefit of U.S. Provisional Patent Application No. 61/873,756, filed Sep. 4, 2013 and U.S. Provisional Patent Application No. 62/026,688, filed Jul. 20, 2014 the contents of which are hereby incorporated by reference herein.

BACKGROUND

Multimedia streaming in a viewing environment (e.g., a home environment) has become prevalent due to increasing device capabilities, better network infrastructure, and availability of a large number of sources. Devices that may support multimedia streaming include, for example, televisions, set-top boxes, gaming consoles, mobile phones, tablets, and laptops. Some specialized products, such as the CHROMECAST® multimedia streaming player available from Google, Inc., the APPLE TV® multimedia streaming player available from Apple, Inc., and the ROKU® multimedia streaming player available from Roku, Inc., are examples of streaming devices which may be used by viewers in a viewing environment (e.g., a home viewing environment).

Streaming-capable devices may use an external display (e.g., a TV) to show content to users. The characteristics of the viewing environment in a multimedia delivery system may vary greatly due to different setups, which may result in different viewing distance, differing amounts of ambient light, and other differing environmental conditions.

SUMMARY

Systems, methods, and instrumentalities are disclosed for delivering visual information to streaming-capable devices in a viewing environment, such as a home environment or a commercial environment. The visual information can be adapted to user behavior and/or viewing conditions in such a way as to deliver a satisfactory user experience while conserving network resources, such as bandwidth and/or capacity. Viewing distance and/or ambient light may be estimated. These factors may affect viewing conditions in a viewing environment.

A method of delivering multimedia content may involve estimating a viewing condition of a user and adapting a stream of the multimedia content as a function of estimated viewing condition. The viewing condition may comprise at least one of a viewing distance or an ambient light level. The viewing distance may be estimated, for example, using a camera and/or a remote control. The ambient light level may be estimated, for example, using an ambient light sensor and/or geolocation information.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
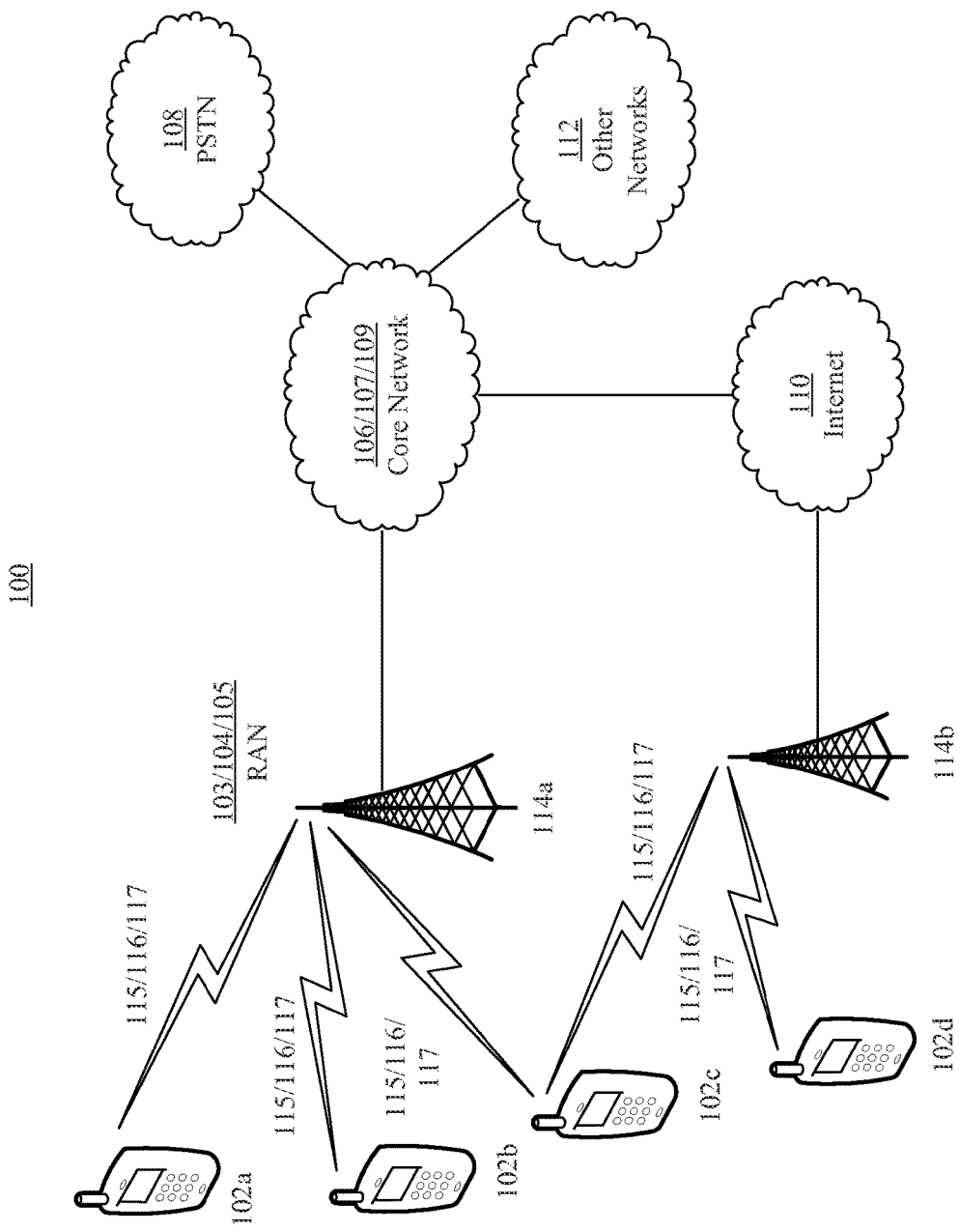
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a. 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a. 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b. 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B. Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b. 102c. 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
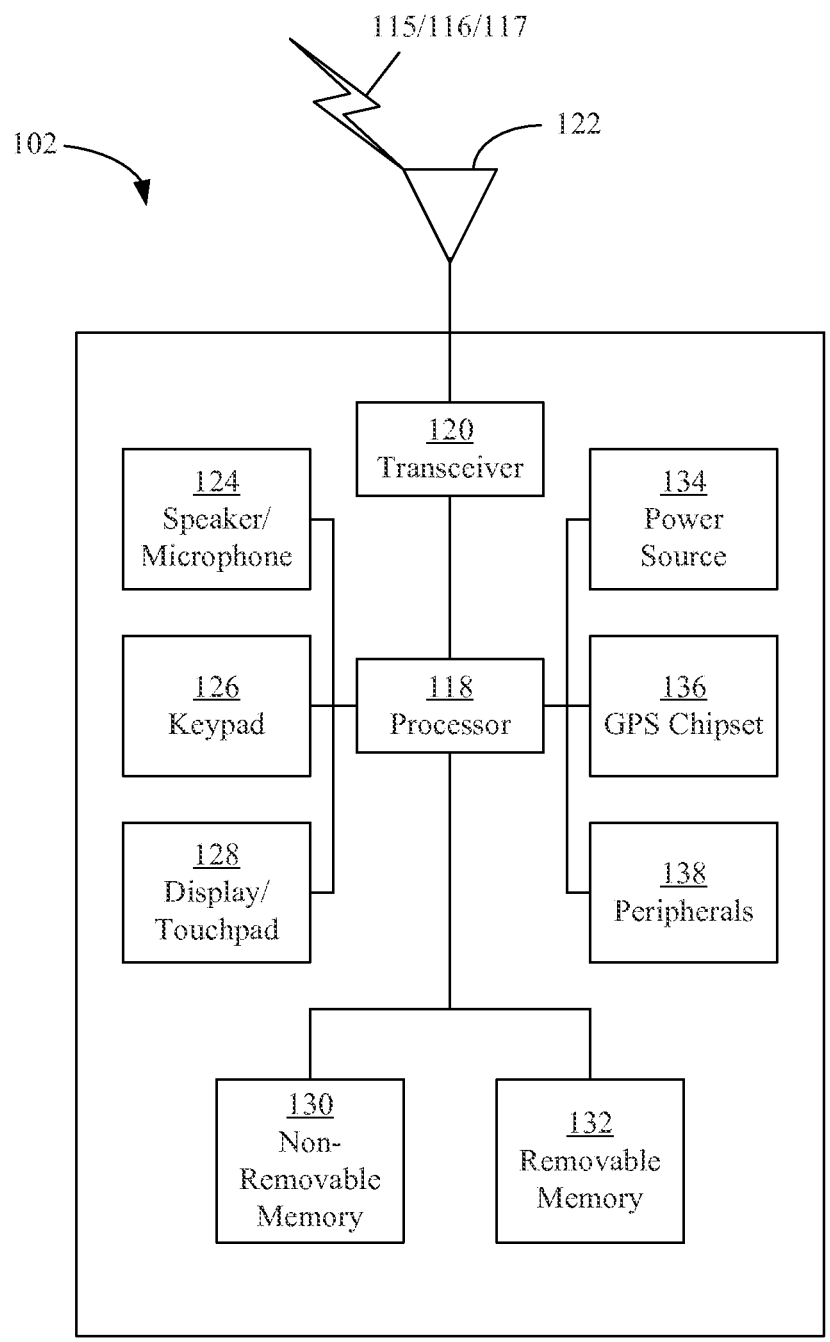
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs). Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a. 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM)

radio unit, a digital music player, a media player, a video game player module, an Internet browser, and the like.

Figure 1C:
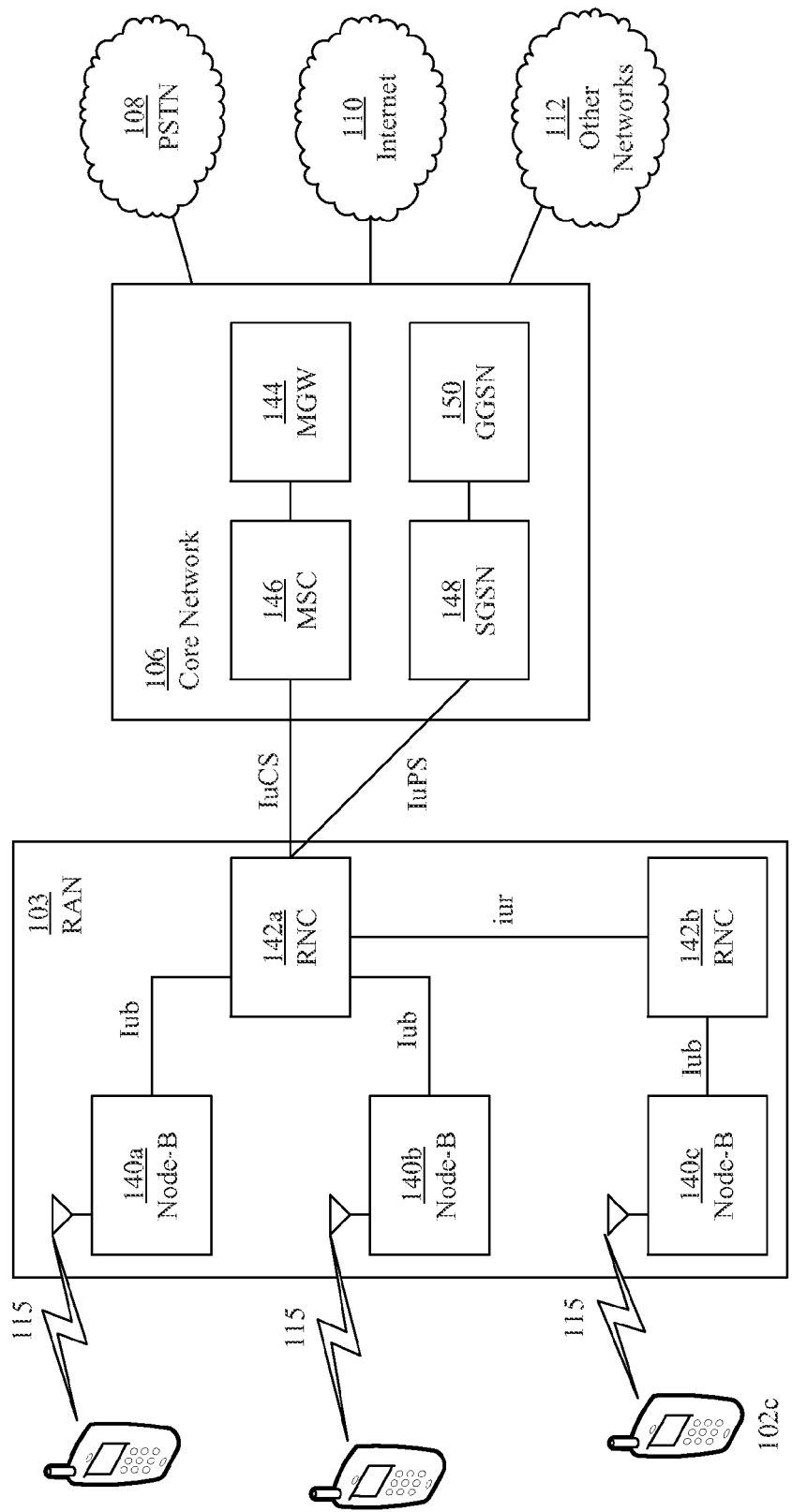
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
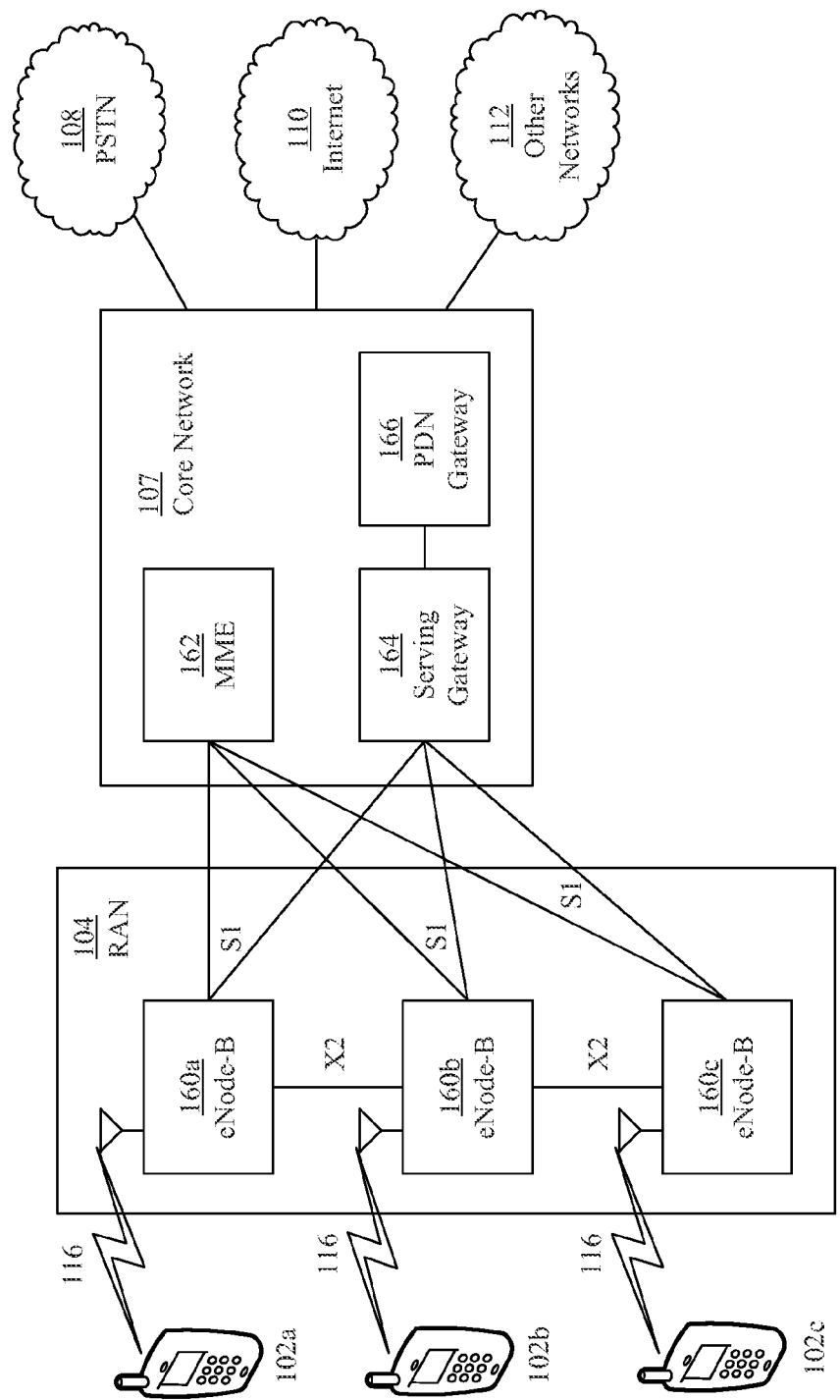
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b. 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a. 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
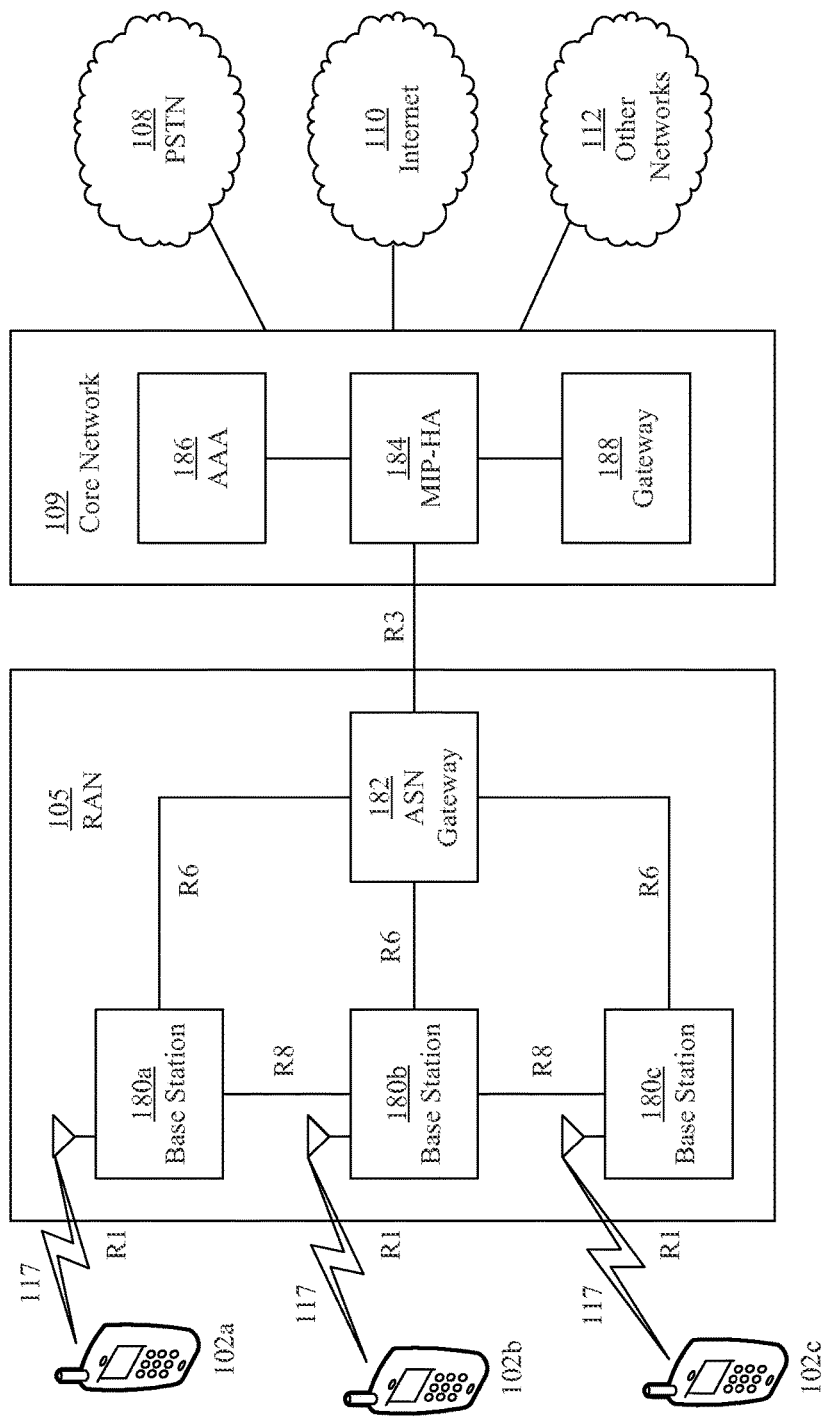
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b. 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

A system for delivery of visual information to streaming-capable devices, for example, in a viewing environment such as a home environment or a commercial environment, may adapt to user behavior and viewing conditions in such a way as to deliver a satisfactory user experience while conserving wireless network resources, e.g., bandwidth and/or capacity. Techniques may be disclosed herein for estimating viewing distance and ambient light, which may be two factors that may affect viewing conditions in a viewing environment, such as a home environment or a commercial environment. Based on viewing conditions, a bandwidth rate may be adapted, e.g., to conserve bandwidth or other system resources while providing a satisfactory user experience.

The subject matter disclosed herein may be applicable in a variety of contexts, including but not limited to, for example, multimedia streaming client set-top boxes, streaming devices (e.g., the CHROMECAST® multimedia streaming player available from Google, Inc., the APPLE TV® multimedia streaming player available from Apple, Inc., and the ROKU® multimedia streaming player available from Roku, Inc.), entertainment or gaming consoles capable of video streaming (e.g., the XBOX 360® entertainment system available from Microsoft Corp. and the PLAYSTATION 3® entertainment system available from Sony Computer Entertainment, Inc.), tablets, laptops, smartphones, consumer or commercial televisions, and/or smart televisions. The subject matter disclosed herein may also be used with other streaming technologies, such as, but not limited to, HTTP Live Streaming, available from Apple, Inc, or the Dynamic Adaptive Streaming over HTTP (DASH) streaming standard.

A multimedia streaming system may use information about a user's viewing conditions to adapt an encoding process and/or a delivery process to reduce or minimize usage of network bandwidth, power, and/or other system resources. The system may use sensors, e.g., a front facing camera and/or an ambient light sensor of a device (e.g., a set-top box, a remote control, or a wireless transmit/receive unit (WTRU) such as a mobile phone) to detect the presence of the viewer, his or her distance relative to the viewing screen, and/or the level of peripheral illuminance, which may affect the visibility of information on the viewing screen. An adaptation system may use this information to determine a maximum spatial resolution and/or other parameters of visual content that a user may be able to perceive. The adaptation system may adjust encoding and/or delivery options to match the user's perception. The adaptation system may allow the delivery system to achieve a satisfactory user experience, while saving network bandwidth and/or other system resources.

The ability of the human eye to see detail may be limited by the spatial density of the screen that is used to display video. In the context of adaptation of viewing conditions, spatial density may be the number of pixels per degree of viewing angle. Spatial density may be a function of viewing distance and pixel density (e.g., pixels per inch (ppi)) of the viewing screen. For a given viewing screen, a larger viewing distance corresponds to a higher spatial density. If spatial density is beyond the natural limits of the human visual system, the human visual system may not perceive details.

Natural and artificial lighting may reduce contrast and gamut and may produce shifts in color balance in the video as it is projected on the viewing screen. Reduced contrast, e.g., due to viewing screen reflection when watching video in a well-lit room or outdoors, may result in a reduced range of spatial frequencies that a human observer is able to perceive. Higher contrast. e.g., watching video in a dark room, may enable viewers to perceive more details.

Eliminating details that may not be seen, under given viewing conditions, may result in bandwidth savings and/or an improved user experience, e.g., by reducing re-buffering.

Multimedia streaming in a viewing environment, such as a home environment or a commercial environment, has become prevalent due to increasing device capabilities, better network infrastructure, and availability of a large number of sources. Devices that may support such streaming include, for example, set-top boxes, tablets, gaming consoles, and laptops. Some specialized products, such as the CHROMECAST® multimedia streaming player available from Google, Inc., the APPLE TV® multimedia streaming player available from Apple, Inc., and the ROKU® multimedia streaming player available from Roku, Inc., may provide flexibility and choice to viewers.

Streaming-capable devices may use an external display or TV to show content to users. The characteristics of the visual link (e.g., the link formed by a display and the viewer) in a multimedia delivery system in a viewing environment may vary greatly. Factors may include different setups, which may determine viewing distance, and environmental conditions, including the amount of ambient light.

By estimating viewing conditions (such as viewing distance and ambient light) in a viewing environment, a multimedia delivery system can determine the extent to which a user is able to perceive visual information. Using this estimation, the multimedia delivery system can deliver multimedia content that is similar to (e.g., perceptually indistinguishable from) content on which it is based (e.g., the original content), while reducing the bandwidth and capacity requirements of the entire streaming system, helping to improve the user experience by reducing the number of negative factors, such as re-buffering. Distance and pixel density, as may be determined by the viewing screen (e.g., television screen) resolution and size, may affect the amount of visual information that viewers can perceive.

Figure 2:
FIG. 2 is a diagram illustrating examples of different viewing distances between a device and typical viewing locations.

In a home environment or a commercial environment, people may watch streaming content from different distances that typically remain constant for a longer period of time, as compared with viewing video content on a mobile device. For adults, a predictor of viewing distance is the location of the preferred viewing locations in a home or commercial environment (e.g., the location of the furniture). Based on the time of day, many adults watch television sitting at their preferred location day after day, and furniture is typically arranged such that it may provide a comfortable viewing position or positions. FIG. 2 illustrates examples of different viewing distances, including, but not limited to, seating on a sofa in front of a television, from a table in a dining room, and/or from a kitchen.

Figure 3:
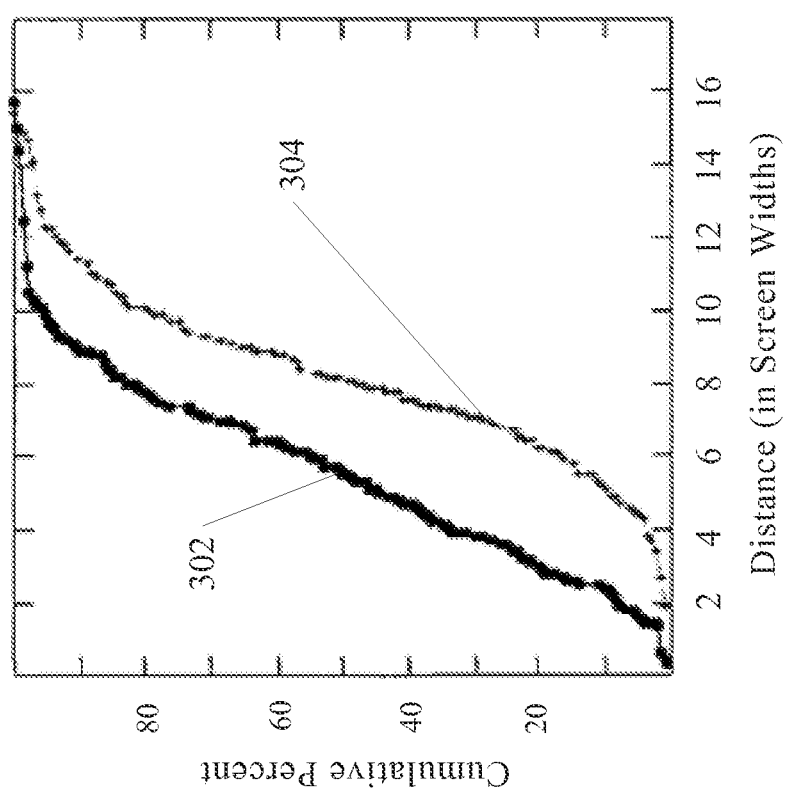
FIG. 3 is a graph illustrating an example distribution of typical viewing distances for children and for adults.

FIG. 3 illustrates an example cumulative percentage distribution of typical viewing distances for children and for adults. An example distribution for children is illustrated as a curve 302, and an example distribution for adults is illustrated as a curve 304. The average viewing distance for adults has been found to be 8.6 screen widths, with a standard deviation of 3.0 screen widths. Children tend to view from a shorter distance.

Figure 4:
FIG. 4 illustrates an example contribution of natural light to the amount of ambient light available in a viewing environment.

Natural light may influence the amount of ambient light in a viewing environment. The amount of natural light during the day is a factor in viewing settings, as it can cause contrast ratios to drop by orders of magnitude, as shown in FIG. 4. At night, artificial lighting is the main source of ambient light, but the amount is typically lower than during the day, and contrast ratios may be higher than during the day.

During the day, average illuminance may be over twice the illuminance during the night. For example, daytime illuminance levels may range from 150-1800 lux, with an average of 585 lux. Nighttime illuminance levels may range from, e.g., 130-340 lux, with an average of 237 lux. These levels were observed during a study that was carried out during a day with cloudy weather; however, the observed levels confirm the observation that ambient light is lower at night than during the day.

Figure 5:
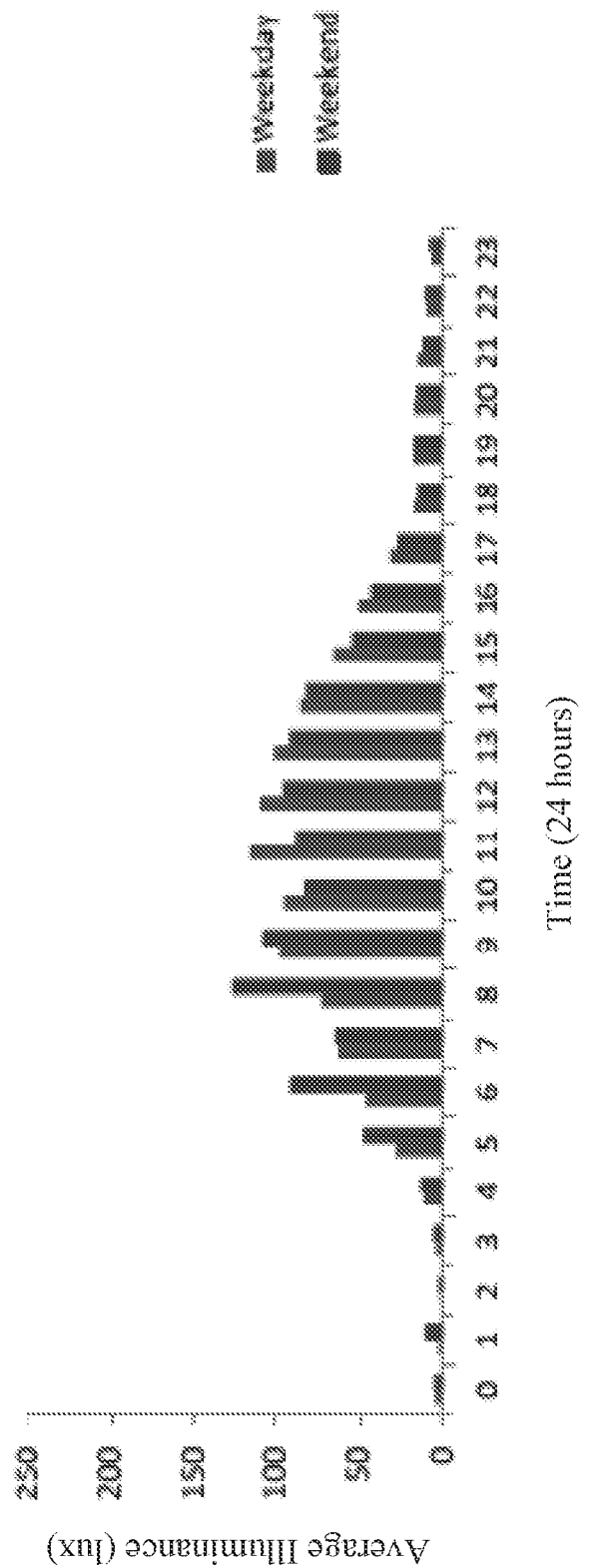
FIG. 5 illustrates the results of a study on illumination level in a room versus a time of a day for television viewing.

Illumination in a room may be higher during the day. FIG. 5 illustrates the results of a study on illumination level on television viewing rooms. In this study, five illuminance measurements were taken in a television viewing room: the center of the room, the viewing location, the top of the television cabinet, the center of the television screen, and at the location of the automatic brightness control (ABC) sensor in the television. As shown in FIG. 5, average illuminance levels were significantly higher during the day, e.g., between 5 am and 5 pm, than at night, e.g., between 6 pm and 4 am.

Streaming in wired and wireless networks, such as cable modem, DSL, 3G, and/or WiFi, etc., may involve adaptation due to variable bandwidth in the network. Bandwidth adaptive streaming, in which the rate at which media is streamed to clients may adapt to varying network conditions, may enable clients to better match the rate at which the media is received to their own varying available bandwidth. In addition, the streaming client may also use information about the viewing conditions to select the rate that may be requested from the server.

Figure 6:
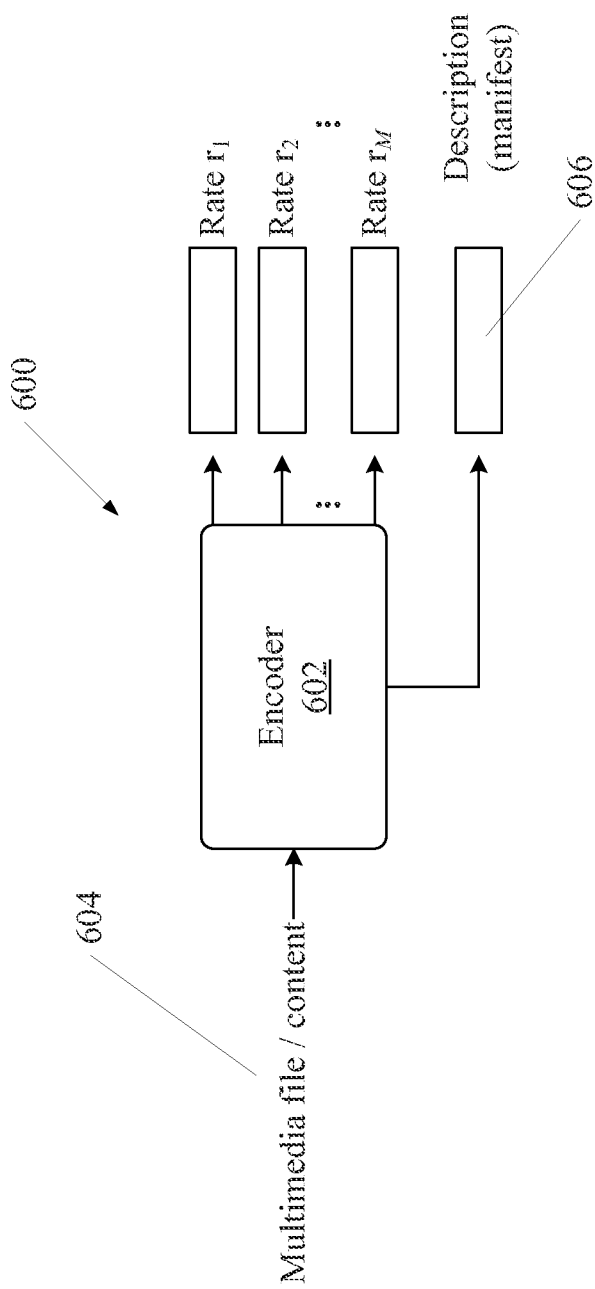
FIG. 6 illustrates an example bandwidth adaptive streaming system.

FIG. 6 illustrates an example bandwidth adaptive streaming system 600. In a bandwidth adaptive streaming system, the content provider may offer the same content at different bit rates. An encoder 602 may encode multimedia content 604 at a number of target bit rates (e.g., $r_1, r_2, \ldots, r_M$). Additionally, each encoding may be partitioned into segments of short duration (e.g., 2-10 sec). A description file 606 or manifest may provide technical information and metadata associated with the content and its multiple representations, enabling selection of the different available rates.

Figure 7:
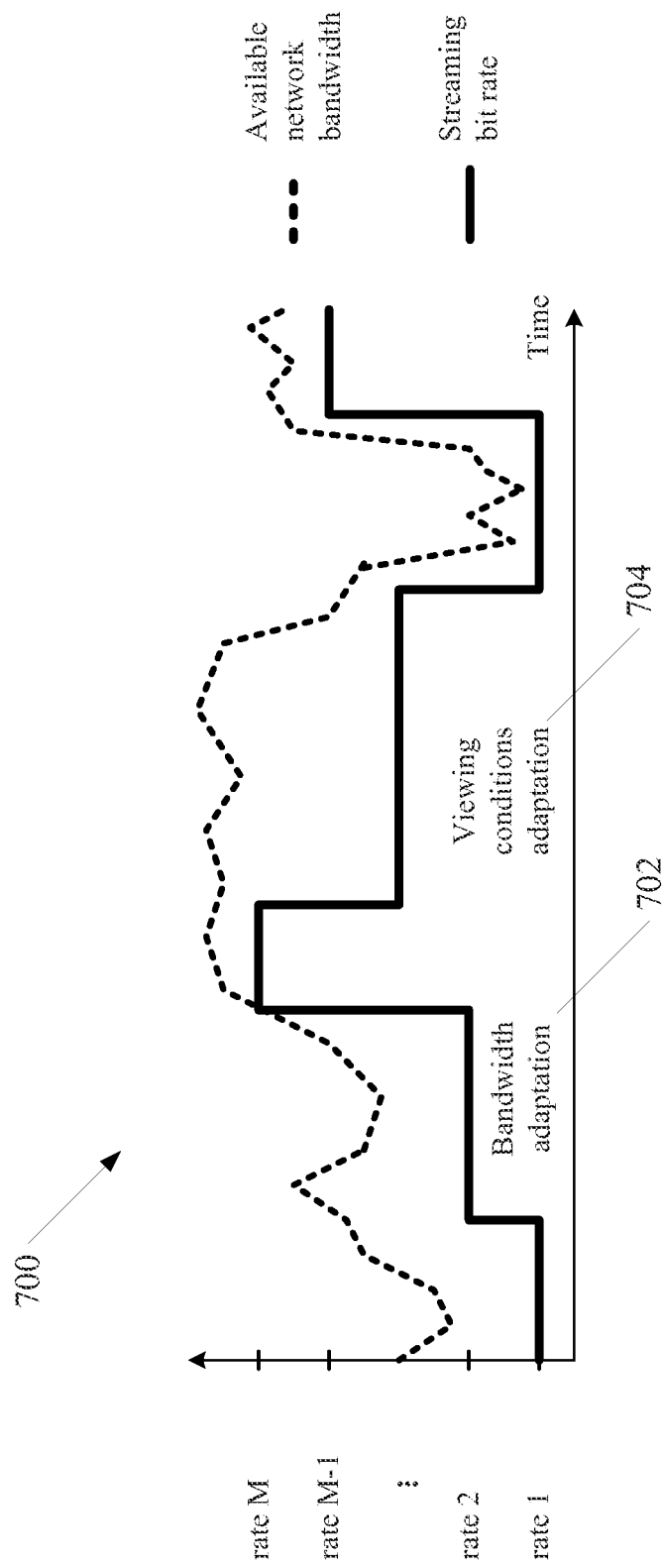
FIG. 7 is a diagram illustrating an example of bandwidth adaptive streaming.

A multimedia streaming system may support bandwidth adaptation. Streaming media players, e.g., streaming clients, may learn about available bit rates from a media content description, e.g., the description file 606. A streaming client may estimate available bandwidth or viewing conditions and may control the streaming session by requesting segments of the content at different bit rates, allowing the streaming client to adapt to bandwidth fluctuations or changing viewing conditions during playback of multimedia content. FIG. 7 illustrates a system 700 with examples of bandwidth adaptation 702 and viewing conditions adaptation 704 to stream at a bandwidth savings.

Figure 8:
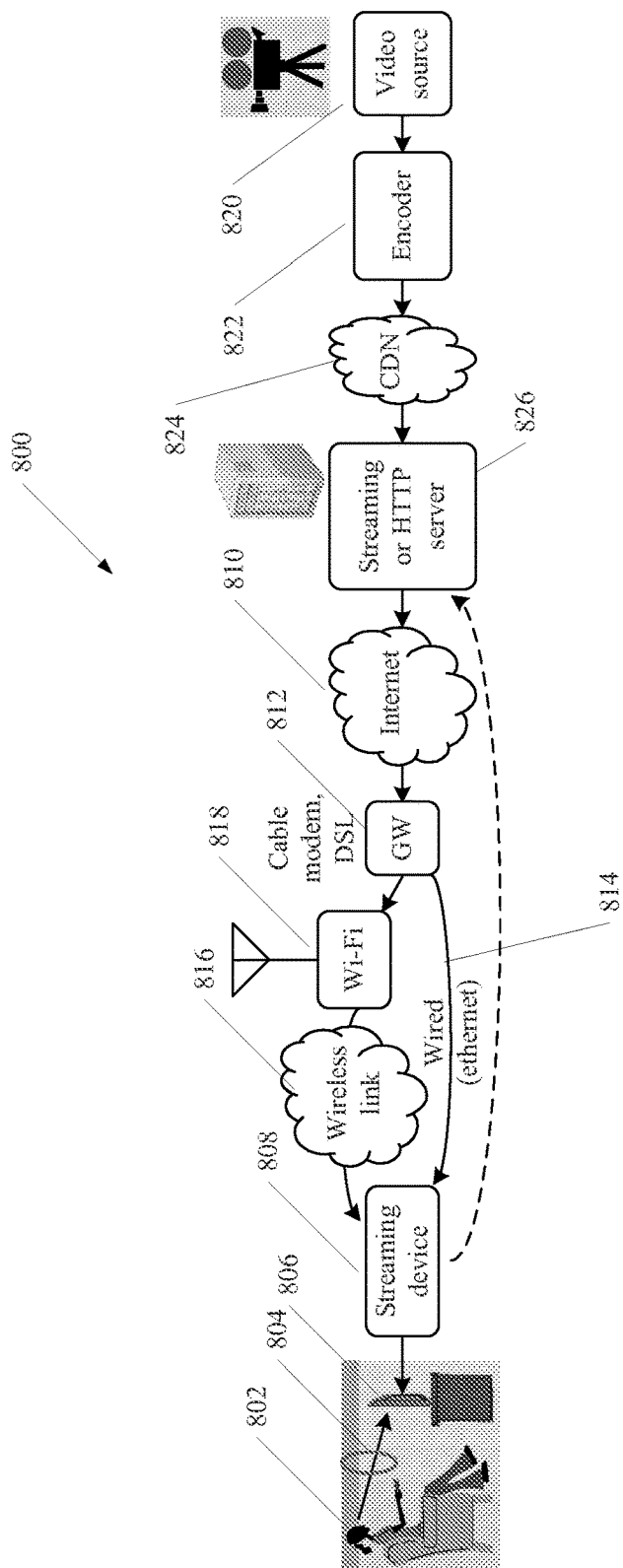
FIG. 8 is a diagram illustrating an example multimedia streaming system.

FIG. 8 illustrates an example multimedia streaming system 800 that may deliver multimedia content, for example, to a home environment or to a commercial environment. A user 802 may have a visual link 804 with a display device 806, such as a television. The television may communicate with a streaming device 808. The streaming device 808 may communicate with a network, such as the Internet 810, via a gateway (GW) 812, such as a cable modem or DSL modem and one or more of a wired link (e.g., Ethernet) 814 and a wireless link 816 (e.g., via a WiFi router 818).

A content provider may provide multimedia content via a video source 820 to the user 802 via the Internet 810. The multimedia content may be encoded by an encoder 822 and delivered via a content delivery network (CDN) 824 via a streaming or HTTP server 826 to the Internet 810.

The sensor or camera may be calibrated by the user for the viewing conditions of the room. The distance from a television or screen to a viewer or viewers in a household entertainment setting or room may be estimated. Methods that facilitate the estimation of this distance or these distances may facilitate the use of viewing conditions adaptive multimedia streaming.

Distance estimation in a viewing environment, such as a home environment or a commercial environment, may be different from a case of using a mobile device. In the case of a mobile device, an assumption may be made that there is a single user and that he or she may have particular preferences in holding the mobile device. In a viewing environment, such as a home environment or a commercial environment, multiple users may be present, and there may be multiple viewing positions and/or points in the room. For example, in a living room, there may be one or multiple couches or chairs that family members can use while watching television. The task of distance estimation may be a learning process, in which a plurality of estimates, e.g., obtained using camera, IR sensor readings, and/or other methods may be collected and clustered. Clustering may result in a list of typical viewing locations in the room. An association process may be used to determine which viewing locations may be used at which points of time. If multiple viewers may be present or may be expected to be present, the viewing point closest to the screen may be used for the purpose of distance-based adaptation.

For distance estimation, a particular distance measurement may be inaccurate and/or irrelevant (e.g., when person is walking close to the TV set with the purpose of turning it off). The statistics collection, clustering, and/or association processes disclosed herein may account for (e.g., disregard) such distance measurements.

Face detection techniques may be used to estimate viewing distance. A television, monitor, or set-top box may comprise a sensor or camera that may be used to monitor viewers. The sensor or camera may be located within the field of view of the users.

Some televisions, monitors, and set-top boxes may comprise one or more cameras that may be used to estimate the viewing distance to one or more viewers in the audience. To facilitate the use of the camera or cameras, the camera or cameras may be calibrated for subsequent use by one or more algorithms to measure the distance to the users.

Figure 9:
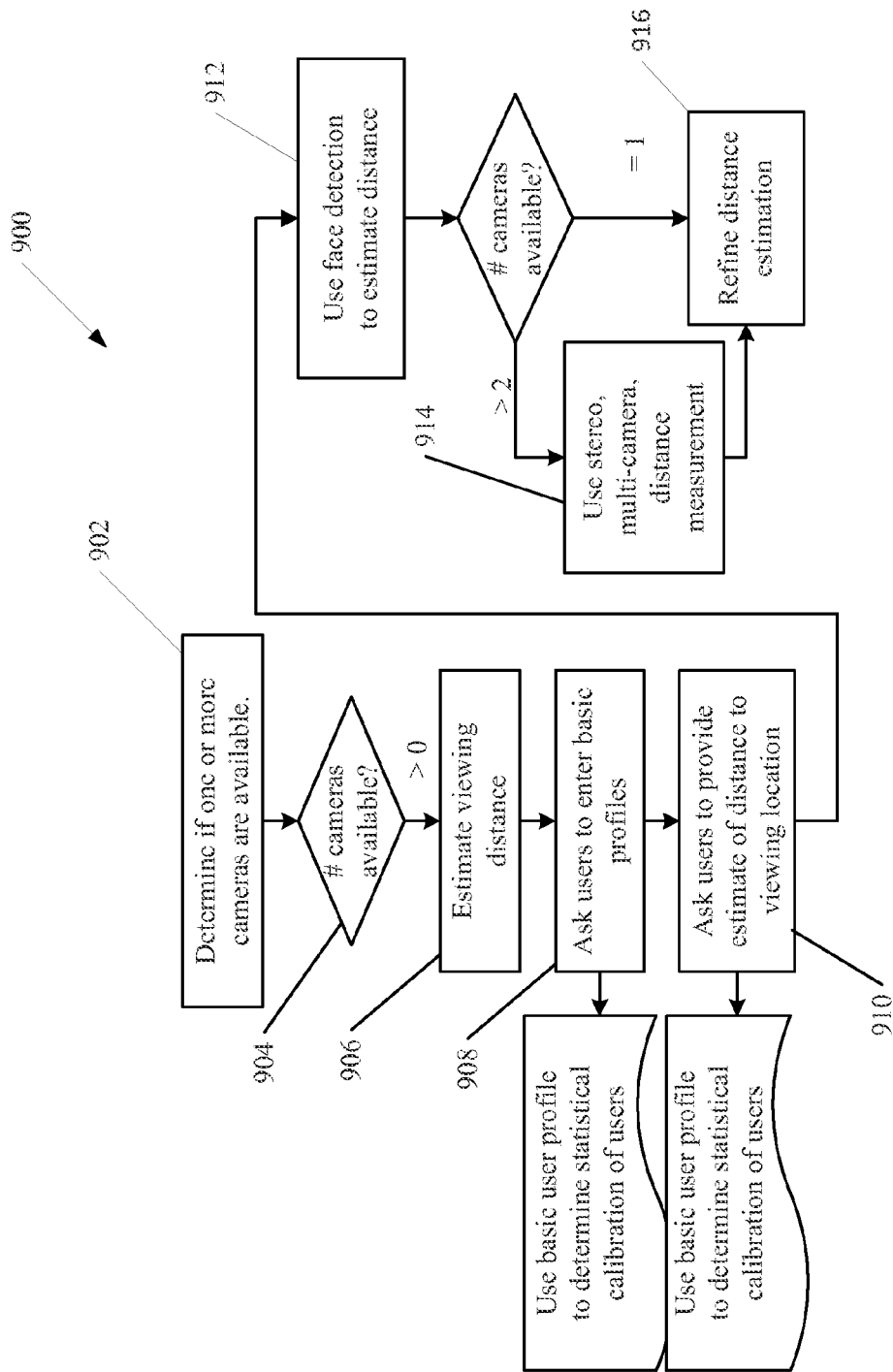
FIG. 9 illustrates an example calibration procedure for estimating a viewing distance.

FIG. 9 illustrates an example calibration procedure 900 for estimating the viewing distance using a camera. At 902-904, the number of available cameras may be determined. If one or more cameras are available, a procedure for estimating the viewing distance may be initiated at 906. At 908, a user's profile, e.g., a basic user profile, may be collected. The basic user profile may be used to determine a statistical calibration of users. A picture may be taken, e.g., with the permission of the user. At 910, the user may be requested to provide a distance estimate from his or her preferred viewing location or locations for the purpose of refining distance estimation. For example, the user may provide an estimate of the distance between the user's current location and a camera and/or a display device. The basic user profile may be used to determine a statistical calibration of users. At 912, face detection may be used to estimate the distance between the user and the camera. This estimation may take into account the user's own estimate of the distance and/or the user's profile information. If multiple cameras are available, the estimation of multiple cameras, e.g., stereo cameras may be used to refine the distance measurement at 914. The distance estimation may be refined at 916.

If a camera is not available, for example, at the television or monitor, other methods may be used to estimate the viewing distance. A remote control, e.g., an infrared (IR) remote control may be used for distance estimation. A remote control may be, but is not limited to, any device that may be controlled by, worn by, or in the presence of a user or viewer. A remote control may include a remote handheld device, a handset, a wearable electronic device, a smart phone, a video game controller, and/or a similar device for control of the entertainment system.

Attenuation is the loss, e.g., gradual loss, in intensity of a signal through a medium, such as air. A calibrated reference may be used to estimate the viewing distance. A television, monitor, or set-top box may use a remote control for controlling the system. A remote control may contain a calibrated reference for the determination of distance from the television to the user or users by the system. The reference may comprise, for example, a visible or infrared light source. A procedure for calibrating a reference light source may be disclosed herein.

A reference source for distance measurement may be based on any type of light, infrared signal, sound wave, etc.

More than one reference source may be used to refine the distance measurement. For example, multiple users may be holding respective remote controls for which a distance measurement may be computed and/or refined.

Due to attenuation, or free space path loss (FSPL), signal strength may vary when a remote control is operated from different areas within a viewing environment. The free space path loss can be calculated as:

$$FSPL = \left(\frac{4\pi \cdot d \cdot f}{c}\right)^2,$$

where d is the distance from the transmitter (e.g., in meters), f is the signal frequency (e.g., in Hertz), and c is the speed of light in a vacuum (e.g., $2.99 \cdot 10^8$ meters/second). This FSPL equation may encapsulate two effects that may result in signal attenuation. Electromagnetic energy spreads out in free space, independently of frequency. The FSPL equation may also encapsulate the receiving antenna's aperture, e.g., how well an antenna can pick up power from an incoming electromagnetic wave. This aperture may depend on the signal's frequency.

For radio applications, FSPL may be expressed in decibels (dB). FSPL may be expressed as:

$$FSPL(dB) = 20 \log_{10}(d) + 20 \log_{10}(f) - 147.55$$

For consumer IR remote controls, a wavelength of 940 nm (320 THz) may be used. Table 1 shows the attenuation of an IR signal at different distances. For a constant frequency, doubling the distance between a transmitter and a receiver may decrease the received signal by 6 dB. A receiver can determine relatively small distance differences, such as different viewing distances in a viewing environment, based on the strength of the IR signal. Table 1 lists attenuation of an IR signal at different distances.

TABLE 1

| Distance [ft] | Distance [m] | Attenuation [dB] | Attenuation relative to 2 ft [dB] |
|---|---|---|---|
| 2 | 0.610 | 138 | 0 |
| 4 | 1.219 | 144 | −6 |
| 8 | 2.438 | 150 | −12 |
| 16 | 4.877 | 156 | −18 |

Once distance is estimated, it can be used to request programming encoded at a resolution and filtering level adequate to produce data similar to, e.g., perceptually indistinguishable from, the original.

An infrared remote control may be calibrated to improve the accuracy of the estimation of the viewing distance. The user may be asked to perform a function. e.g., press a key on the remote control while being located at a known distance or distances away from the screen (e.g., 8 feet, 16 feet, etc.). The IR signal strength from the remote control may be recorded at the known distance or distances. The recorded IR signal strength may be used to correlate with the signal strength received when a user is watching television from other locations and to infer his or her distance, as shown in FIG. 10.

Figure 10:
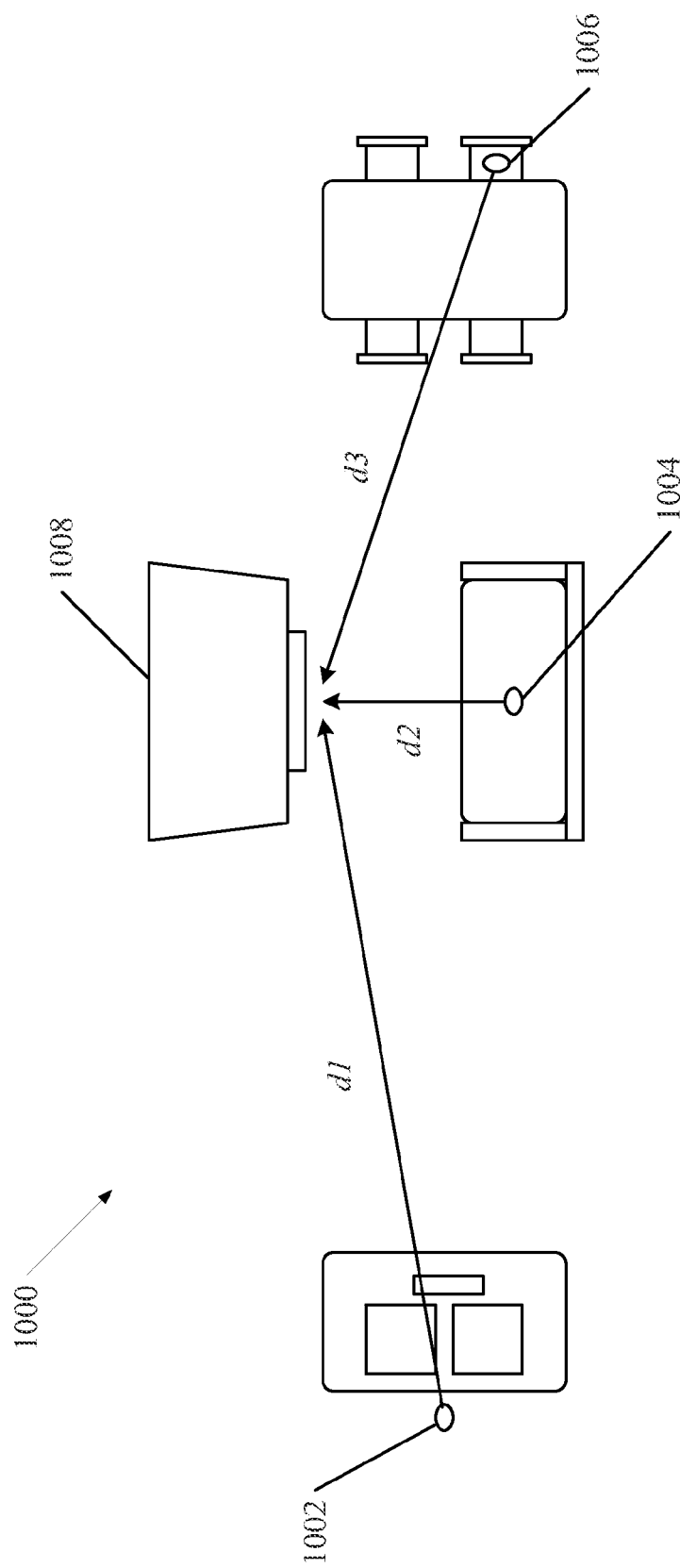
FIG. 10 depicts three viewing locations in a viewing environment.

FIG. 10 depicts three locations 1002, 1004, 1006 in a viewing environment 1000 at respective distances d1, d2, and d3 from a television 1008 which a user may view. The distances d1, d2, and d3 can be determined from the signal strength of an IR remote control recorded at the known distances (e.g., 8 feet, 16 feet, etc.) and the signal strength recorded at the locations 1002, 1004, 1006.

When using a remote control to estimate viewing distance, the transmitted IR power may not be known and may not be the same every time the remote control is used. This may yield inaccurate distance estimates. The user may be asked to periodically perform a calibration in which the signal strength is measured from a known distance. This reference level may serve for future range finding. The remote control may send the transmit power over the IR signal. The remote control may use a regulator or regulators to maintain a constant transmit power.

In addition to FSPL, other characteristics of signal propagation, e.g., multipath scattering and/or reflections, may distort the distance estimate. To take into account these additional characteristics, a more sensitive and expensive IR receiver on the television may be used.

Off-axis pointing (e.g., in which the remote control may not point directly at the IR receiver) may be misinterpreted as a larger distance. The user may be asked to point the remote control directly at the IR receiver.

A range finder may be used. The television, monitor, or set-top box may comprise a range finder, e.g., an ultrasonic, IR, or laser range finder. If this capability is supported, a signal may be sent. The delay before receiving a reflection may be measured. This time delay may be used to estimate the distance to the users as a function of the delay and the speed of the sound wave, IR beam, or laser beam through the medium, e.g., air. Because range finders may not produce clear images, the privacy of the viewers may be preserved.

Calibration may be used to help a range finder distinguish between viewers and furniture. For example, as an initial setup, a user may be asked to let the television, set-top box, or gaming console scan the viewing room with and without viewers. A Doppler technique may be used to differentiate between users. A unique coded waveform may be returned by individual remotes when probed by the range finder's signal or signals.

A range finder in the remote control may be used. The remote control may comprise a laser, ultrasonic or IR range finder. The range finder in the remote may be directed towards the television or display. The range finder may detect reflections and may compute a distance estimate that may be transmitted to the television via the IR signal of the remote control or by other instrumentalities used by the remote control to communicate with the television or display.

User gestures may be used for control of the system. A gaming or entertainment console, for example, may use an IR laser and a sensor to obtain an image, e.g., a depth image, of the room. This image may be coupled with conventional camera input and used for gesture recognition. Gestures may be used with or without the use of a remote at the same time. The user's gestures may be used to estimate or refine an estimate of a distance to the user. A user may be asked to enter a basic profile of their body type during a calibration procedure. The body type for users may be used to estimate distance to the user from an analysis of their body motions, such as motions of their arms.

More than one user may watch video simultaneously, resulting in multiple distance estimates. In this case, the distance estimate of the viewer that is closer or closest to the display may be used because this is the viewer that perceives the most detail. The distance estimate of a different viewer may be used, for example, if the closest viewer is known to be inattentive.

Estimation of the distance to more than one user may be supported through the use of a headset or three-dimensional (3D) glasses. Glasses may enable users to view 3D video using a variety of techniques. Examples of such techniques may include polarized light and electronic shutters. Either of these methods may be extended to support the solutions described herein for measurement purposes. The headset or glasses may transmit information to the streaming client (e.g., television, set-top box, or gaming console) to enable distance estimation.

Some of the hardware in active shutter glasses may be utilized for distance computation. For example, active shutter glasses that receive an infrared timing signal from a television may use an infrared power computation in reverse to compute the distance from the television. This may be more reliable than the IR remote signal, in that because the IR source in the television is connected to AC power, it does not have a battery degradation issue. Distance computation information may be transmitted to the streaming client (e.g., television, set-top box, or gaming console).

There may be additional uses of shutter glasses and time multiplexing. For example, multiple viewers may watch multiple different shows on the on the same television. The glasses for this scenario may have a communication channel back to the TV. Distance computation information may be transmitted to the streaming client (e.g., television, set-top box, or gaming console).

A set of glasses may act as an intelligent WiFi-connected device that may perform various functions. Such devices may, for example, operate as a streaming client, and may redirect output to a television in a living room. The glasses may have all the sensors and tools available to implement depth estimation to the television and perform distance-based adaptation.

Similar functionality can also be implemented using a handset-type device or device located elsewhere on a person (e.g., the streaming device does not have to be head-mounted).

Microphones and/or sound may be used to estimate viewing distance. Some televisions and gaming consoles may be equipped with external or built-in microphones. Some televisions and gaming consoles may use accessories, such as a camera, that may be equipped with a microphone array. The microphones may be used to capture the viewer's speech, which may be used to identify the direction of the viewer relative to the television. The signal-to-noise ratio (SNR) of speech may be used to give an estimate of the distance. Some televisions may perform speech recognition that may involve the user speaking into the remote control. Speech recognition may be performed on the television itself. This would further simplify our approach for estimating the viewer's distance. This technique may be used complementary to other techniques described in the disclosure to further improve the accuracy of estimating the viewer's distance and location.

The amount of ambient light in a viewing room may be estimated. While mobile devices may be equipped with sensors or cameras that may be used to obtain an accurate estimate of available ambient light, streaming devices in a viewing environment may lack these sensors or cameras. Other techniques may be used to estimate the available ambient light.

Available ambient light levels may be estimated, for example, using a sensor. Sensors may be found in some televisions, where they may be used for dimming screen brightness to save energy. Using such sensors may yield a relatively accurate measurement of the amount of light in the room where video is being watched. Sensors may be used in combination with other techniques to estimate ambient light.

If the television is adjusting brightness based on its own light sensor, then the adaptation may take into account the adjusted brightness (e.g., brightness as function of ambient light). If the television is the adaptive streaming device, then the streaming adaptation algorithm may be designed in concert with the display brightness adaptation. If the television is not the adaptive streaming device, then television brightness may be inferred, for example, based on ambient light information, by the set-top box or other device acting as adaptive streaming client. Certain features of HDMI interfaces, such as device menu control and system information, may also be used to obtain brightness-related settings in the television.

In addition, or if a sensor is not available, indirect measurements may be used to estimate the amount of available ambient light. A number of methods may be used to estimate ambient light, individually or in any combination.

Time of day may be used to infer the level of ambient illuminance in a typical viewing room (e.g., a living room). The time of day may be obtained from the server, for example, by examining the timestamp that is found in the HTTP header of the response sent by the server as part of the streaming session. A timestamp may be given in GMT and may be adjusted to the appropriate time zone once geographic information is obtained.

The geographic location where content is being watched may be obtained, for example, from a service provider such as Google using the streaming device's IP address with or without the consent of the user. Geolocation information (e.g., latitude and longitude, ZIP code, and/or time zone) may be used to determine sunrise and sunset information, thus giving an estimate of the amount of daylight when the content is being viewed. Weather information could be used to enhance the estimate.

Once an illuminance level estimate is obtained, it may be used to request multimedia content encoded at a resolution and filtering level adequate to produce data similar to, e.g., perceptually indistinguishable from the original.

Sensors in other devices present in the viewing environment may be used to obtain an estimate of ambient light. For example, applications for smartphones or tablets may allow users to use the device as a remote control for a television, set-top box, or other streaming device (e.g., smart phones may control streaming devices; smartphone applications may be used to control a television or a DVR, etc.). Smartphones or tablets may have ambient light sensors (ALS) available. An application used for remote control may be extended to obtain readings from the ALS and pass this information to the streaming client.

If a mobile device lacks a suitable ALS sensor, its cameras, (e.g., a rear-facing camera, a front-facing camera, or both) can be used to measure light.

Streaming clients other than televisions may incorporate the ALS sensor. For example, an ALS sensor may be incorporated in a set-top box, a gaming or entertainment console, a networked Blu-ray player, a dedicated streaming media player box, etc. The addition of an ALS sensor may add little cost to the device, and could save significant bandwidth to an associated back-end media service. For example, a set-top box may use a built-in ALS sensor to determine the ambient illuminance in the room where the set-top box is displaying streaming video to an attached TV. The set-top box may use the ambient illuminance reading to adapt the bit rate of the video stream based on the knowledge that higher levels of ambient light result in a lower level of perceptible detail on the viewing screen.

When an ALS sensor is present, it may be exposed through standard sensor APIs by the operating system. For example, in the ANDROID® operating system, one can create a class SensorEventListener and then look if callbacks are coming with TYPE_LIGHT sensor information. In the WINDOWS® operating system, e.g., starting from the WINDOWS 7® operating system with extra SDKs, it may be exposed as a class CAmbientLightAwareSensorEvents. Both APIs may report values from an ALS, for example, expressed in lux.

Ambient light estimation based solely on time of day and geolocation may not consider the physical layout of the room, e.g., whether the viewing room has any windows, whether the blinds or drapes are open or closed, and/or how much outdoor light is coming in. If a user employs a mobile device as a remote control for the streaming device, absolute ambient light readings can be received from the mobile device. The streaming device can record and store these ambient light readings as observations, together with the time each reading was taken. The streaming device may use these ambient light readings as calibration readings to the ambient light levels at particular times of day. For example, the streaming device may determine from the recorded ambient light readings an average or expected ambient light reading at particular times of the day. The streaming device may interpolate to determine expected ambient light readings for in-between times when insufficient recorded ambient light readings are available. At times when the user is not using the mobile device as a remote, or when the ALS readings from the mobile device are otherwise determined to be not available or not reliable, the calibrated time of day readings (e.g. the predicted, averaged, and/or interpolated ambient light readings) may be used.

A streaming client may estimate viewing distance in a viewing environment. Techniques, such as the techniques described herein, may be used to estimate viewing distance. The technique(s) that may be used to estimate viewing distance may depend on the availability of modules used for distance estimation. The process to estimate viewing distance in a viewing environment may include algorithms and combinations of algorithms described herein.

Viewing distance and/or ambient light may be estimated in a viewing environment, such as a home environment or a commercial environment. Once these two parameters have been estimated, a client can use them, in addition to the client's view of available bandwidth, to determine the best resolution and other encoding parameters at which the client can request multimedia content from a server, as shown in FIG. 11.

Figure 11:
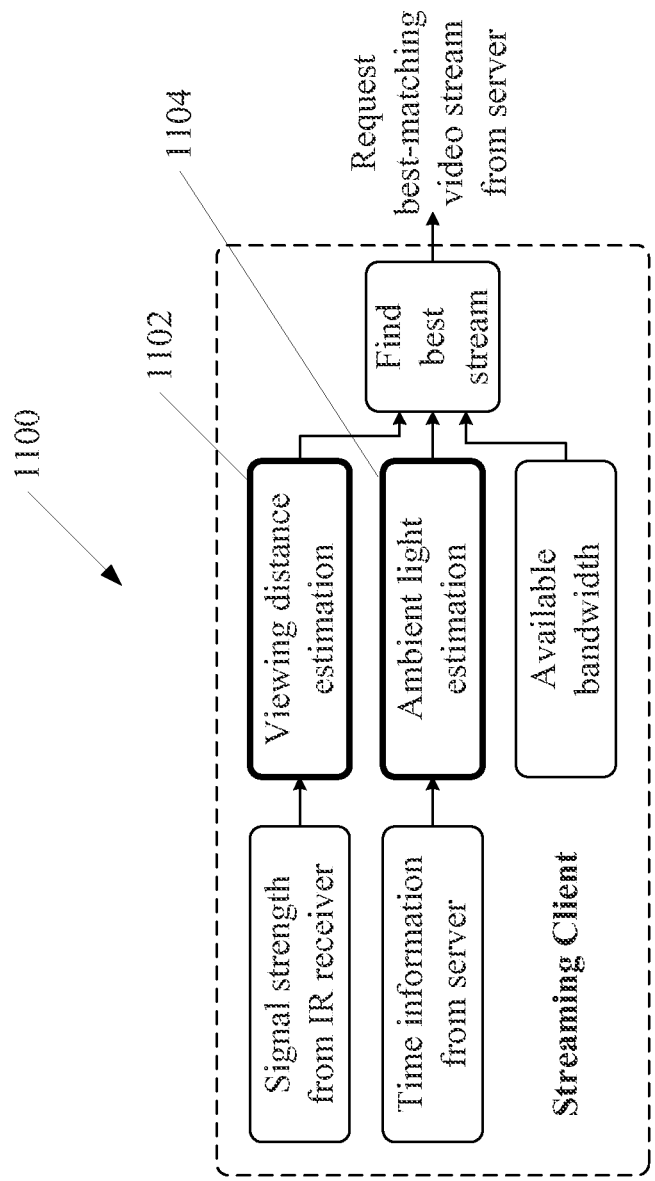
FIG. 11 is a diagram that illustrates an example streaming client.

FIG. 11 illustrates an example streaming client 1100. The streaming client 1100 may comprise a viewing distance estimation module 1102 and/or an ambient light estimation module 1104. The viewing distance estimation module 1102 may receive a signal strength from an IR receiver and/or information from one or more cameras and may estimate a viewing distance. The ambient light estimation module 1104 may receive time and/or geolocation information from a server and may estimate an ambient light level.

The streaming client 1100 may use viewing conditions information, such as the viewing distance and/or ambient light, in addition to available bandwidth information. The viewing distance, the ambient light, and/or the available bandwidth information may be used simultaneously. For example, if the streaming client detects that there are no viewers watching the video content, it may switch to the lowest available bit rate or stop streaming, even if enough bandwidth is available for streaming at higher bitrates. Similarly, if not enough bandwidth is available, the client may select a lower bit rate than what it would otherwise be necessary for streaming video at an acceptable level given a set of existing viewing conditions.

Figure 12:
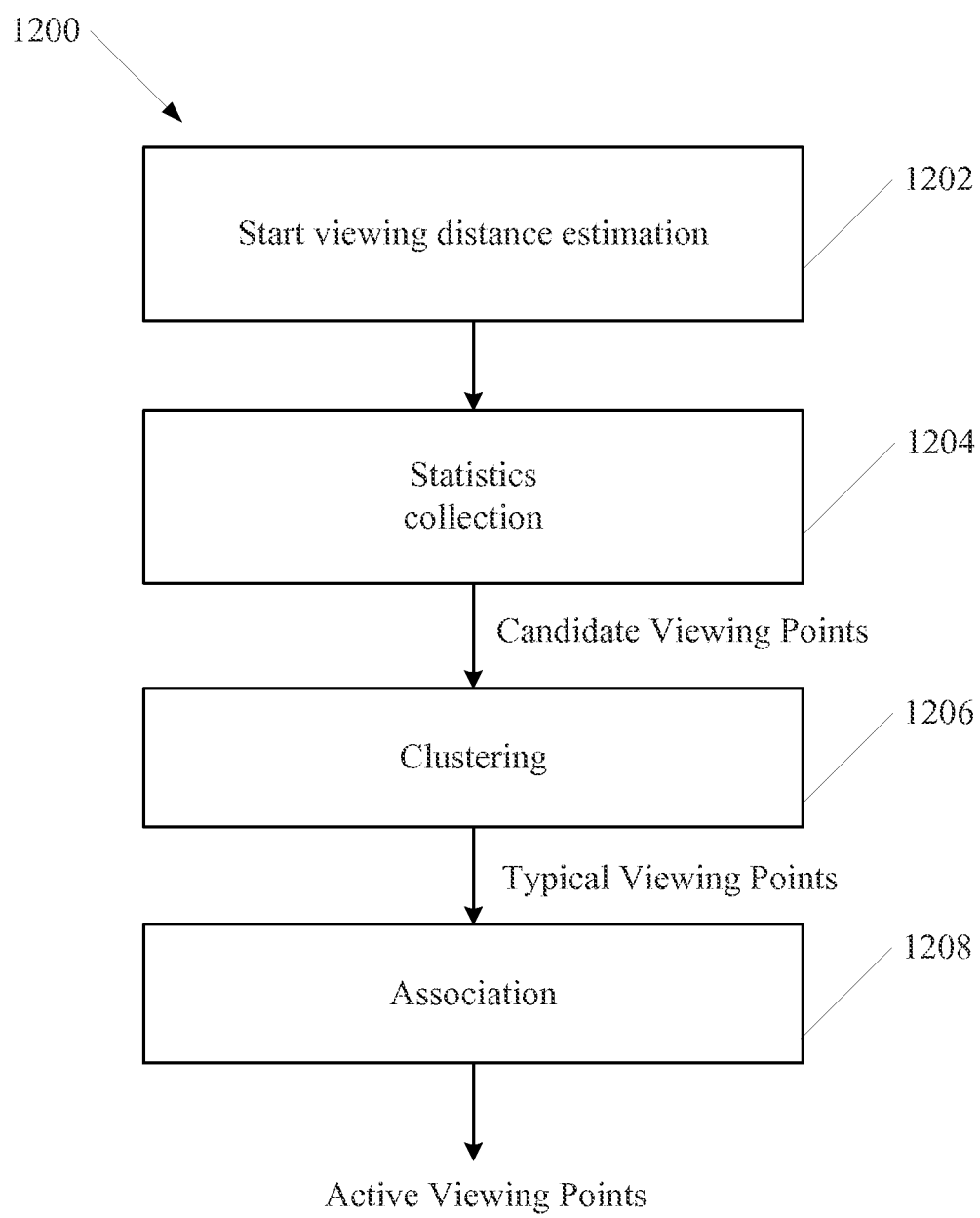
FIG. 12 illustrates an example of estimating viewing distance.

FIG. 12 illustrates an example of estimating viewing distance. The process to estimate viewing distance 1200 may be used by a device to determine a set of typical viewing points, for example, for distance-based adaptation. Estimating viewing distance 1202 may include statistics collection, clustering, and/or association. Statistics collection 1204 may include techniques to determine a set of one or more candidate viewing points, such as techniques described herein. Clustering 1206 may include analysis and/or organizing of the set of candidate viewing points that may be collected in statistics collection into a set of typical viewing points in a viewing area (e.g., a room). Clustering 1206 may, for example, classify the candidate viewing points (e.g. a set of possible viewing locations observed during the statistics collection process over a time period) into one or more clusters wherein each cluster consists of candidate viewing points with similar spatial location within the viewing area. The clustered groups may then be used to define typical viewing points. Viewing locations may change at points of time, for example the Statistics Collection process 1204 may be repeated or may be run continuously to generate or maintain updated sets of candidate viewing points, and Clustering 1206 may be repeated or may be run continuously to generate or maintain updated typical viewing points. Association 1208 may be used to determine one or more active viewing points. An active viewing point may be a typical viewing point from the set of typical viewing points determined in clustering that may be currently active, or that may be used at a point in time. For example, Association 1208 may determine that a user is viewing the displayed video from an active viewing point.

Viewing locations within a room may be determined. The streaming client may determine the technique that may be used to collect statistics. The streaming client may determine techniques that may be used to collect statistics based on a pre-determined setup (e.g., a vendor may deploy a standard equipment configuration). The streaming client may determine techniques that may be used to collect statistics based on a dynamic equipment detection.

Figure 13:
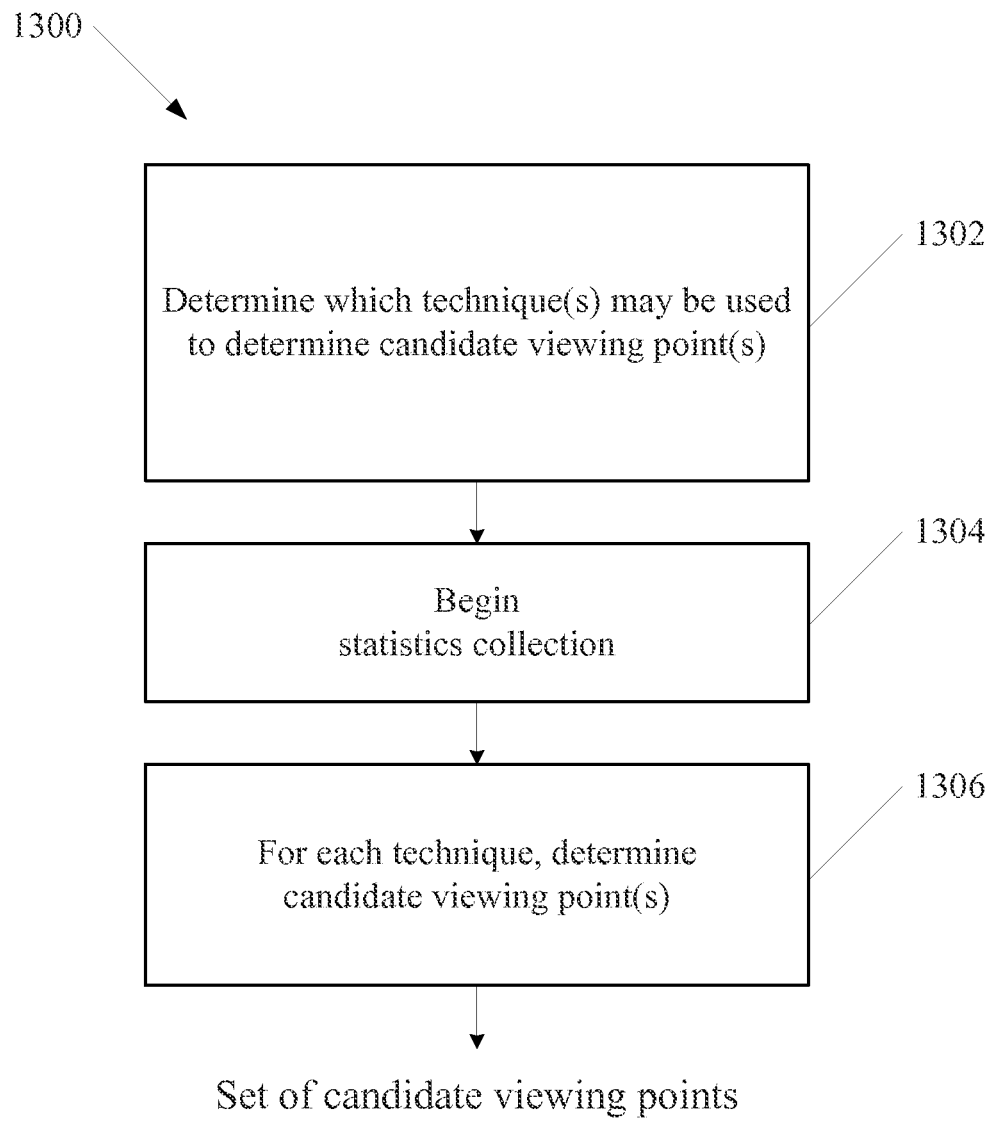
FIG. 13 is an example of statistics collection on viewing locations.

FIG. 13 is an example of statistics collection, e.g., how a device may perform statistics collection. Techniques for statistic collection may be used to gather a collection of candidate viewing points, such as after the technique to be used is determined. The techniques described herein may be used one or more times to gather data and/or candidate viewing points. Statistics collection 1300 may occur at one or more times. Statistics collection may occur once during a calibration step. Statistics collection may occur at the beginning of the new streaming session. Statistics collection may occur periodically during a streaming session. Statistics collection may occur continuously during a streaming session. Statistics collection may occur on demand (e.g., based on user request and/or when new viewing locations may be determined using techniques that were not available when viewing locations were initially determined). Statistics collected before and/or during one streaming session may be used to determine candidate viewing points for use in streaming sessions. Statistics collected across multiple streaming sessions may be combined, such as, to determine the candidate viewing points. A technique (or series of techniques) may be selected at 1302 to be used to determine candidate viewing points. Statistics collection begins at step 1304. One or multiple (e.g. each of the) techniques selected at 1302 may be used to determine a candidate viewing point at 1306. A collection of candidate viewing points is gathered.

Figure 14:
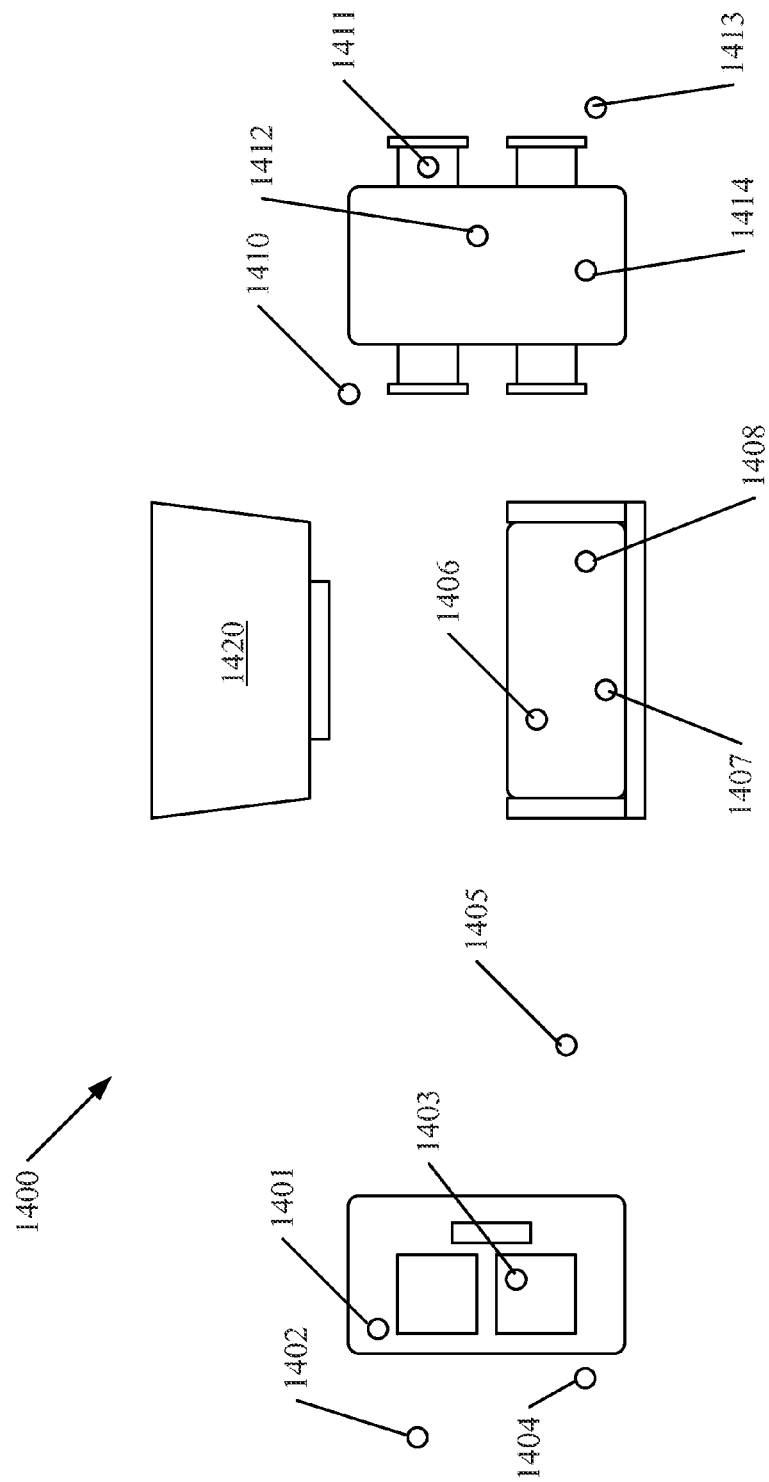
FIG. 14 is an example of statistics collection showing a set of possible viewing locations in a viewing area.

FIG. 14 is an example of statistics collection showing a set of candidate viewing points in a viewing area 1400, for viewing a device (e.g., a television) 1420. In FIG. 14, candidate viewing points 1401-1414 may be gathered by statistics collection.

Figure 15:
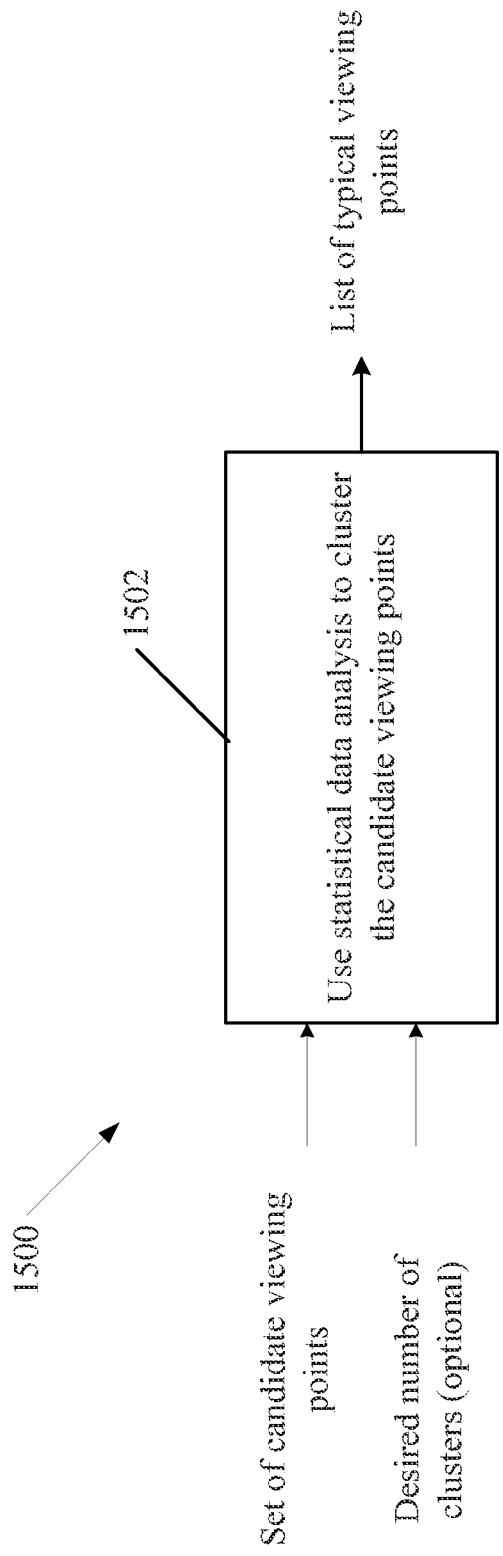
FIG. 15 is an example of clustering typical viewing locations.

FIG. 15 is an example of a clustering process 1500. The set of candidate viewing points collected in statistics collection may be one or more. The candidate viewing points may be miscalculated, for example, due to noise. Possible viewing locations may be irrelevant, for example if a person walks towards the TV set with the purpose of turning the TV off. Miscalculated locations may be identified and/or eliminated by clustering and/or grouping. A number of candidate viewing points may be clustered and/or grouped into a set of typical viewing points.

Statistical data analysis techniques 1502 may be used to identify clusters of points and/or outlying locations (e.g., outliers). Statistical data analysis techniques that may be used for clustering include hierarchical clustering, centroidbased clustering, and/or density-based clustering. The number of clusters may be determined based on results of data analysis. The number of clusters may be used as an input to a data analysis algorithm. The data analysis algorithm may be based on the number of available bitstreams that may be used with viewing distance adaptation. Statistical data analysis techniques may result in a list of typical viewing points.

Figure 16:
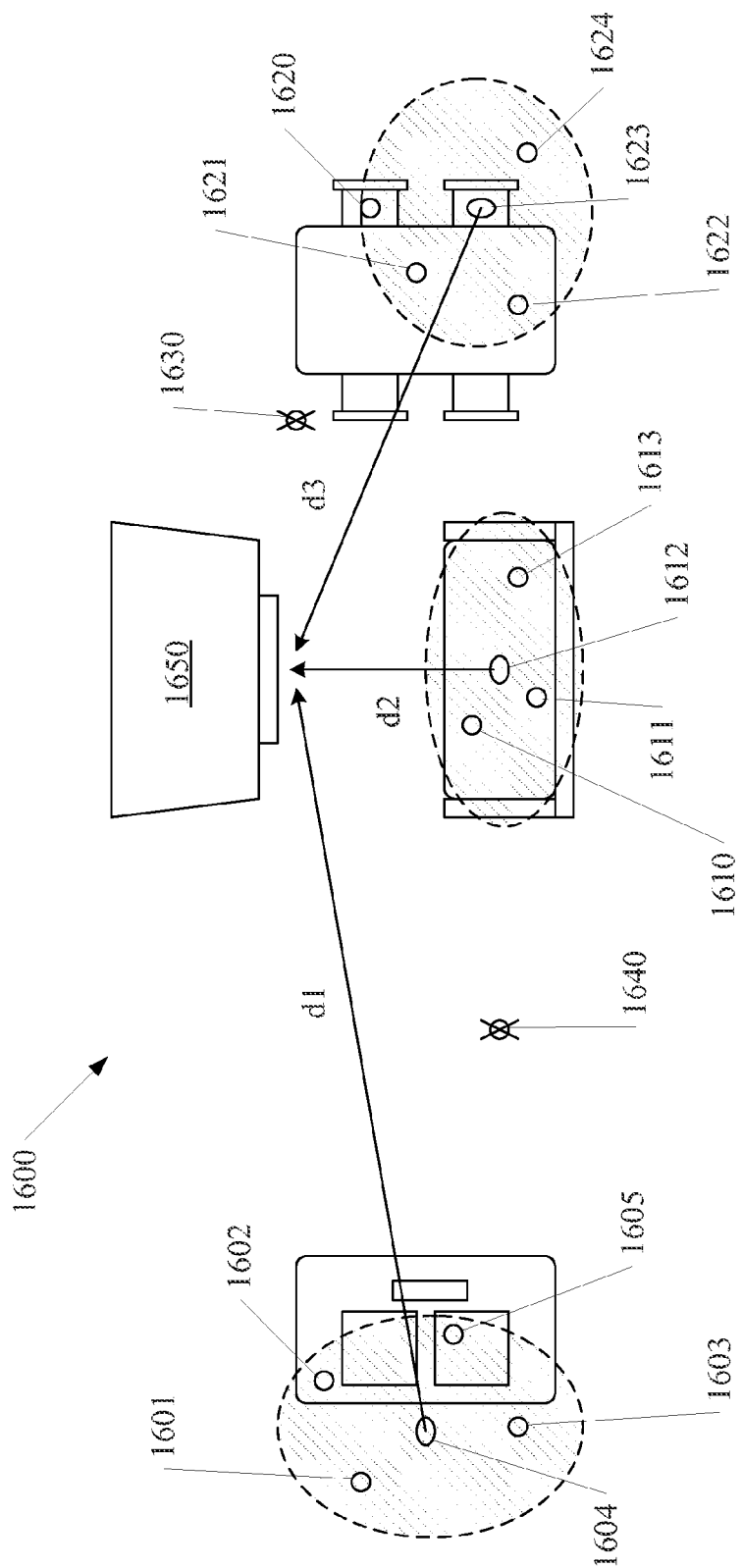
FIG. 16 is an example of clustering of viewing locations and outlying viewing locations.

FIG. 16 is an example of clustering of candidate viewing points (including outlying viewing locations) to produce a set of typical viewing points in a viewing area 1600, for viewing a device (e.g., a television) 1650. In FIG. 16, candidate viewing points 1601-1605 are within a cluster, 1610-1613 are within another cluster, and 1620-1624 are within yet another cluster. Candidate viewing points 1630 and 1640 are determined to be outliers. The set of candidate viewing points associated with a cluster may be identified, for example, when clustering is complete. The average viewing distance over points in the cluster may be calculated, for example, for one or more clusters (e.g., each cluster). The average viewing distance may represent one or more (e.g., all) points in the cluster. A cluster may be a typical viewing point in the viewing environment. Outliers may be discarded.

A list of typical viewing points in a viewing environment may be produced by clustering. The typical viewing point closest to the screen may be used for distance-based adaptation. Different viewing locations (e.g. different typical viewing points) may be active (e.g. may be used as a vantage point to watch the displayed video) at different times. For example, viewers may sit at a table to have breakfast in the morning while watching TV, while viewers may sit at the couch in the evening to watch a movie. Viewers may initially be at one typical viewing point, but later viewers may move to another typical viewing point. The viewing point closest to the screen may change at different points in time during a streaming session.

Figure 17:
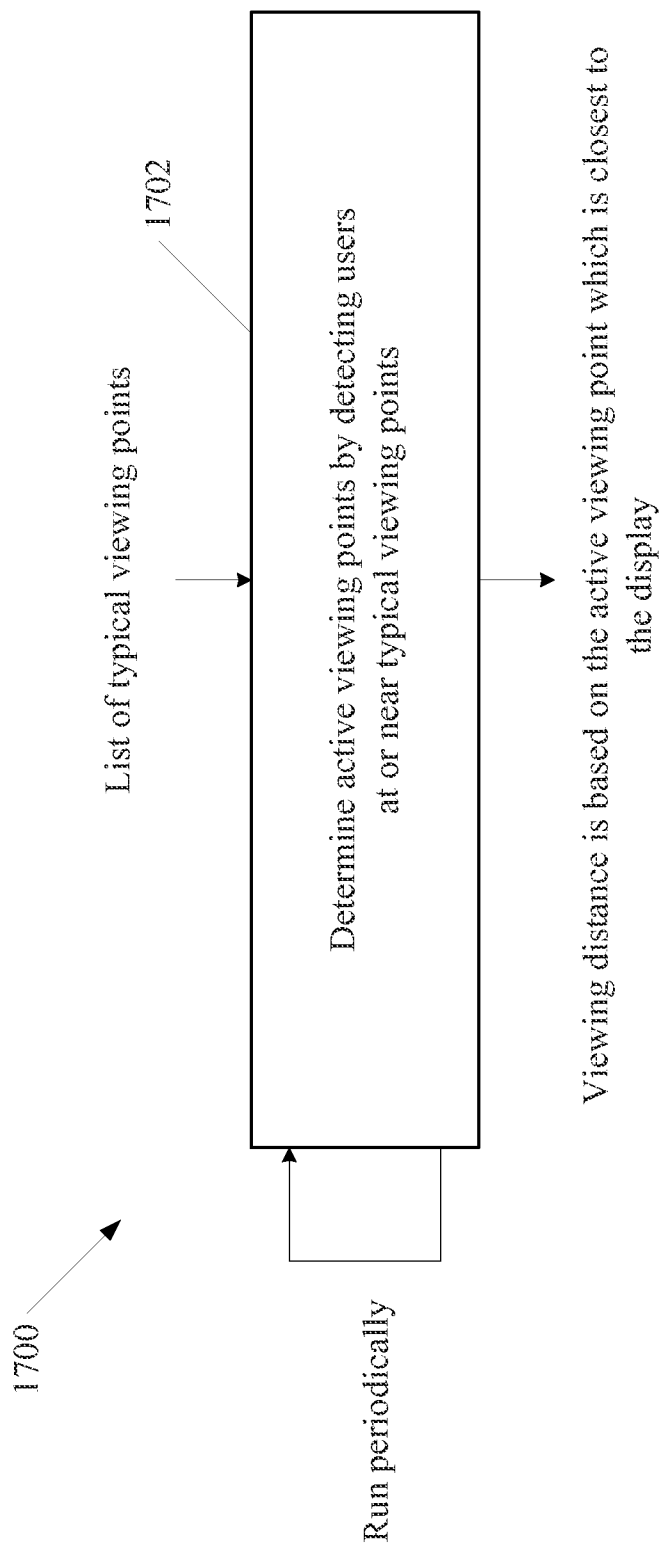
FIG. 17 is an example of association of viewing locations to user location.

FIG. 17 is an example of association 1700 of typical viewing points to user location. The association of the typical viewing point that may be active at a point in time may be performed in order to determine one or more active viewing points. User presence near or at a typical viewing point may be determined 1702. Whether viewers move from one typical viewing point to another typical viewing point may be determined during a streaming session. Users may be present at one or more of the typical viewing points, which may result in the determination of one or more active viewing points. If users are present at more than one active viewing point, the active viewing point closest to the screen may be used for distance-based adaptation.

A historical record of the candidate viewing points (e.g. observations of possible user locations) and/or the active viewing points may be recorded and may be used as an additional input to the association process. The historical record may associate each candidate viewing point with a time the candidate viewing point was recorded or observed. The historical record may associate each active viewing point with a time or a time range at which the active viewing point was determined to be active. The association process may consider the historical record when determining which of the typical viewing points may be currently active. For example, if the historical record shows that a particular typical viewing point is usually active at a particular time of day, then the association process may be biased toward the selection of that typical viewing point as an active viewing point at the particular time of day. As another example, if the association process is unable to determine a current user location based on sensor inputs because such sensor inputs are not currently available, or because the readings from such sensors are determined to be not currently reliable, then the association process may determine the active viewing point based on the most likely active viewing point based on the historical record and the current time of day.

The processes and instrumentalities described herein may apply in any combination, may apply to other wireless technology, and for other services. A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A method, comprising:
    collecting viewing estimation statistics based upon historical viewing locations in a viewing room observed over a time period;
    determining one or more clusters of viewing locations in the viewing room based upon the viewing estimation statistics;
    associating a currently active viewing location of a user with one of the clusters of the viewing locations; and
    adapting a streaming rate for playback of streaming multimedia content on a device based at least upon the associated cluster.

2. The method of claim 1, further comprising determining an ambient light level.

3. The method of claim 1, wherein collecting the viewing estimation statistics comprises obtaining an estimate using one or more sensors.

4. The method of claim 1, wherein the currently active viewing location of the user is estimated from attenuation of a signal from an infrared remote control device.

5. The method of claim 1, wherein determining the one or more clusters of viewing locations based upon the viewing estimation statistics further comprises discarding at least one viewing location that is determined to be an outlier.

6. The method of claim 2, wherein the adapting of the streaming rate is further based on the determined ambient light level.

7. The method of claim 3, wherein the one or more sensors comprises at least one of: a camera or an infrared (IR) sensor.

8. A device, comprising:
    a processor configured to:
        collect viewing estimation statistics based upon historical viewing locations in a viewing room observed over a time period;

determine one or more clusters of viewing locations in the viewing room based upon the viewing estimation statistics;

associate a currently active viewing location of a user with one of the one or more clusters of the viewing locations; and adapt a streaming rate for playback of streaming multimedia content based at least upon the associated cluster.

9. The device of claim 8, wherein the processor is further configured to determine an ambient light level.

10. The device of claim 8, further comprising a camera for estimating a viewing distance from the device to the cluster associated with the currently active viewing location.

11. The device of claim 8, wherein a viewing distance from the device to the cluster associated with the currently active viewing location of the user is estimated from attenuation of a signal from an infrared remote control device.

12. The device of claim 8, wherein the processor is further configured to determine that a viewing location is an outlier, wherein the outlier is not included in the one or more clusters of the viewing locations based upon the viewing estimation statistics.

13. The device of claim 9, wherein the adaptation of the streaming rate is further based on the determined ambient light level.

* * * * *